United States Patent
Zare Seisan (10) Patent No.: US 12,313,914 B2
(45) Date of Patent: May 27, 2025

(54) INTELLIGENT ACTUATED NOSE BRIDGE

(71) Applicant: Snap Inc., Santa Monica, CA (US)

(72) Inventor: Farid Zare Seisan, San Diego, CA (US)

(73) Assignee: Snap Inc., Santa Monica, CA (US)

( * ) Notice: Subject to any disclaimer, the term of this patent is extended or adjusted under 35 U.S.C. 154(b) by 435 days.

(21) Appl. No.: 17/717,987

(22) Filed: Apr. 11, 2022

(65) Prior Publication Data
US 2023/0324710 A1  Oct. 12, 2023

(51) Int. Cl.
G02C 5/12 (2006.01)
G02B 27/01 (2006.01)

(52) U.S. Cl.
CPC ......... *G02C 5/122* (2013.01); *G02B 27/0176* (2013.01); *G02B 2027/0138* (2013.01); *G02B 2027/0178* (2013.01)

(58) Field of Classification Search
CPC ...... G02C 5/122; G02C 13/003; G02C 5/045; G02B 27/0176; G02B 2027/0138; G02B 2027/0178; G02B 2027/0181
See application file for complete search history.

(56) References Cited

U.S. PATENT DOCUMENTS

| | | |
|---|---|---|
| 3,365,263 A | 1/1968 | Allen |
| 10,423,009 B1 | 9/2019 | Pattikonda et al. |
| 2013/0038510 A1* | 2/2013 | Brin ............... G02B 27/017 345/8 |
| 2013/0050642 A1 | 2/2013 | Lewis et al. |
| 2017/0277254 A1 | 9/2017 | Osman |
| 2018/0046147 A1 | 2/2018 | Aghara et al. |
| 2018/0292679 A1 | 10/2018 | Mou et al. |
| 2019/0056601 A1 | 2/2019 | Lee |
| 2019/0072772 A1 | 3/2019 | Poore et al. |

(Continued)

FOREIGN PATENT DOCUMENTS

| | | |
|---|---|---|
| CN | 108254942 | 7/2018 |
| CN | 208334805 | 1/2019 |

(Continued)

OTHER PUBLICATIONS

"International Application Serial No. PCT/US2023/017560, International Search Report mailed Jul. 11, 2023", 4 pgs.

(Continued)

*Primary Examiner* — James C. Jones
(74) *Attorney, Agent, or Firm* — Schwegman Lundberg & Woessner, P.A.

(57) ABSTRACT

Systems and method describe an actuator control system for controlling an intelligent actuated nose bridge on a pair of wearable glasses. The actuator control system receives a set of measurement data corresponding to a length of the nose bridge, generates a predicted set of measurement data for the length of the nose bridge, transmits the predicted set of measurement data to pneumatic actuators coupled to the nose bridge, captures a first set of images of the nose bridge, generates an augmented set of measurement data for the nose bridge, generates an adjusted set of measurement data based on the predicted set of measurement data and the augmented set of measurement data, and transmits the adjusted set of measurement data to the pneumatic actuators coupled to the nose bridge.

20 Claims, 6 Drawing Sheets

(56) References Cited

U.S. PATENT DOCUMENTS

| | | |
|---|---|---|
| 2019/0250651 A1 | 8/2019 | Liu et al. |
| 2021/0068277 A1 | 3/2021 | Mulliken et al. |
| 2021/0297584 A1 | 9/2021 | Moubedi |
| 2022/0066500 A1 | 3/2022 | Vankipuram et al. |
| 2023/0324711 A1 | 10/2023 | Zare Seisan |
| 2023/0324713 A1 | 10/2023 | Zare Seisan |
| 2023/0324714 A1 | 10/2023 | Zare Seisan |
| 2023/0341704 A1 | 10/2023 | Olwal et al. |

FOREIGN PATENT DOCUMENTS

| | | |
|---|---|---|
| CN | 110543023 | 12/2019 |
| CN | 212181165 | 12/2020 |
| CN | 114137727 | 3/2022 |
| CN | 118984967 A | 11/2024 |
| CN | 119013609 A | 11/2024 |
| CN | 119032312 A | 11/2024 |
| EP | 3683614 | 7/2020 |
| WO | 2022071975 | 4/2022 |
| WO | WO-2023200637 A1 | 10/2023 |
| WO | WO-2023200647 A1 | 10/2023 |
| WO | WO-2023200650 A1 | 10/2023 |
| WO | WO-2023200657 A1 | 10/2023 |

OTHER PUBLICATIONS

"International Application Serial No. PCT/US2023/017560, Written Opinion mailed Jul. 11, 2023", 8 pgs.
"International Application Serial No. PCT/US2023/017466, International Search Report mailed Jul. 24, 2023", 5 pgs.
"International Application Serial No. PCT/US2023/017466, Written Opinion mailed Jul. 24, 2023", 8 pgs.
"International Application Serial No. PCT/US2023/017605, International Search Report mailed Jul. 24, 2023", 5 pgs.
"International Application Serial No. PCT/US2023/017605, Written Opinion mailed Jul. 24, 2023", 7 pgs.
"International Application Serial No. PCT/US2023/017571, International Search Report mailed Jul. 24, 2023", 5 pgs.
"International Application Serial No. PCT/US2023/017571, Written Opinion mailed Jul. 24, 2023", 9 pgs.
"U.S. Appl. No. 17/717,961, Non Final Office Action mailed Nov. 15, 2024", 10 pgs.
"U.S. Appl. No. 17/717,995, Restriction Requirement mailed Nov. 21, 2024", 7 pgs.
"International Application Serial No. PCT/US2023/017466, International Preliminary Report on Patentability mailed Oct. 24, 2024", 10 pgs.
"International Application Serial No. PCT/US2023/017560, International Preliminary Report on Patentability mailed Oct. 24, 2024", 10 pgs.
"International Application Serial No. PCT/US2023/017571, International Preliminary Report on Patentability mailed Oct. 24, 2024", 11 pgs.
"International Application Serial No. PCT/US2023/017605, International Preliminary Report on Patentability mailed Oct. 24, 2024", 9 pgs.
"U.S. Appl. No. 17/717,995, Response filed Jan. 21, 2025 to Restriction Requirement mailed Nov. 21, 2024", 9 pgs.
"U.S. Appl. No. 17/717,974, Restriction Requirement mailed Feb. 6, 2025", 6 pgs.
"U.S. Appl. No. 17/717,961, Response filed Feb. 12, 2025 to Non Final Office Action mailed Nov. 15, 2024", 8 pgs.
"U.S. Appl. No. 17/717,995, Non Final Office Action mailed Mar. 5, 2025", 14 pgs.
"U.S. Appl. No. 17/717,974, Response filed Mar. 28, 2025 to Restriction Requirement mailed Feb. 6, 2025", 8 pgs.
"U.S. Appl. No. 17/717,974, Non Final Office Action mailed Apr. 21, 2025", 26 pgs.
Machine translation of CN 212181165 retrieved electronically from Espacenet, Apr. 14, 2025, (2025), 11 pgs.
"U.S. Appl. No. 17/717,961, Notice of Allowance mailed Apr. 25, 2025", 8 pgs.

* cited by examiner

INTELLIGENT ACTUATED NOSE BRIDGE

TECHNICAL FIELD

Embodiments herein generally relate to adjusting eyeglass frame dimensions. More specifically, but not by way of limitation, embodiments herein describe an actuator control system for an intelligent actuated nose bridge.

BACKGROUND

An eyeglass nose bridge is the portion of the frame of an eyeglass which makes contact with a wearer's nose. The nose bridge rests upon the wearer's nose and dictates an optimal positioning of the eyeglass lenses with respect to the wearer's eyes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Traditionally eyeglass nose bridges are rigid and attached permanently to the eyeglass. Typically, the nose bridge is not adjustable in size. If the nose bridge needs to be adjusted, the nose bridge or frame may need to be replaced. Adjusting the nose bridge impacts the pupillary distance (PD) measurements of the wearer, and thus, nose bridge adjustments are an important modification to a pair of glasses that impacts the vision of the wearer. Systems herein describe an intelligent actuated glasses' nose bridge. The intelligent actuated glasses' nose bridge is controlled by an actuator control system. The actuator control system adjusts the length of the nose bridge of a pair of eyeglasses so as to provide a more comfortable fit to a wearer of the eyeglasses.

The pair of eyeglasses may be an apparatus with at least one of augmented reality or virtual reality capabilities. In some examples, the pair of eyeglasses contains at least two actuators on each side of the nose bridge. For example, the eyeglasses contain a first pair of actuators on a left side of the nose bridge (e.g., where the left side of the nose bridge connects to a left eyeglass lens) and a second pair of actuators on a right side of the nose bridge (e.g., where the right side of the nose bridge connects to a right eyeglass lens). The actuators may be, for example, pneumatic actuators that are connected via an air line to a tank of compressed air or gas.

The actuator control system receives a set of measurement data of the length of the nose bridge on a pair of eyeglasses. Based on the set of measurement data, the actuator control system generates a predicted set of measurement data for the length of the nose bridge. The predicted set of measurement data is generated using a first machine learning model. The first machine learning model may be trained on historical user data. After generating the predicted set of measurement data for the nose bridge, the actuator control system transmits the predicted set of measurement data to the pneumatic actuators. The actuator control system causes the pneumatic actuators to modify the current length of the nose bridge based on the predicted set of measurement data (e.g., shrink or expand the length of the nose bridge).

In some examples, before causing the pneumatic actuators to modify the current length of the nose bridge, the actuator control system may instruct a wearer of the eyeglasses to place the pair of glasses on a flat, non-moving surface. The actuator control system may receive an indication from position sensors on the pair of glasses to verify that the glasses are on a stable surface before performing any adjustments to the nose bridge.

Once the length of the nose bridge has been changed based on the predicted set of measurement data, the actuator control system captures images of the nose bridge. The captured images may be analyzed to verify if the length of the nose bridge is optimal. In some examples, the captured images are analyzed using a second machine learning model that is trained on an image dataset of eyeglasses with a nose bridge. The second machine learning model generates an augmented set of measurement data of the nose bridge based on the analysis of the images.

In some examples, the actuator control system captures two sets of images. The first set of images, as described above, is captured when the user is not wearing the glasses. The actuator control system may further capture a second set of images when the user is wearing the glasses. Both the first set of images and the second set of images may be analyzed using the second machine learning model.

Based on the predicted set of measurement data and the augmented set of measurement data, the actuator control system generates an adjusted set of measurement data. The adjusted set of measurement data is a modification to the predicted set of measurement data. The actuator control system then transmits the adjusted set of measurement data to the pneumatic actuators coupled to the eyeglass nose bridge. Further details regarding the actuator control system are described below.

Networked Computing Environment

Figure 1:
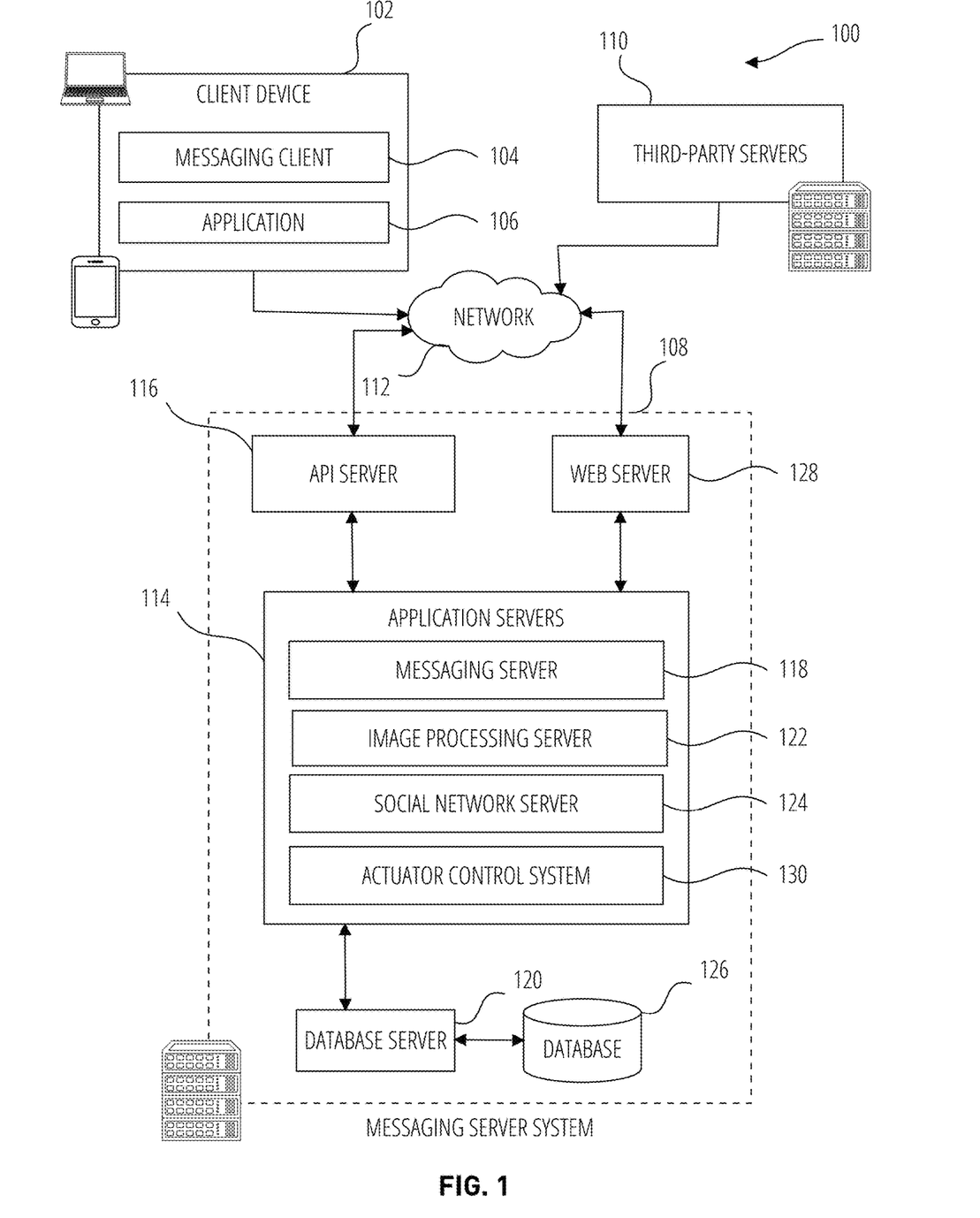
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, a social network server 124, and an actuator control system 130. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

The social network server 124 supports various social networking functions and services and makes these functions and services available to the messaging server 118. Examples of functions and services supported by the social network server 124 include the identification of other users of the messaging system 100 with which a particular user has relationships or is "following," and also the identification of other entities and interests of a particular user.

The actuator control system 130 generates adjustments to the length of an eyeglasses' nose bridge by remotely controlling a pair of eyeglasses with an AR/VR display system. For example, the actuator control system 130 may intelligently predict the length of an eyeglasses' nose bridge for a unique user using a machine learning model and may adjust the length of the nose bridge using a series of pneumatic actuators.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

Figure 2:
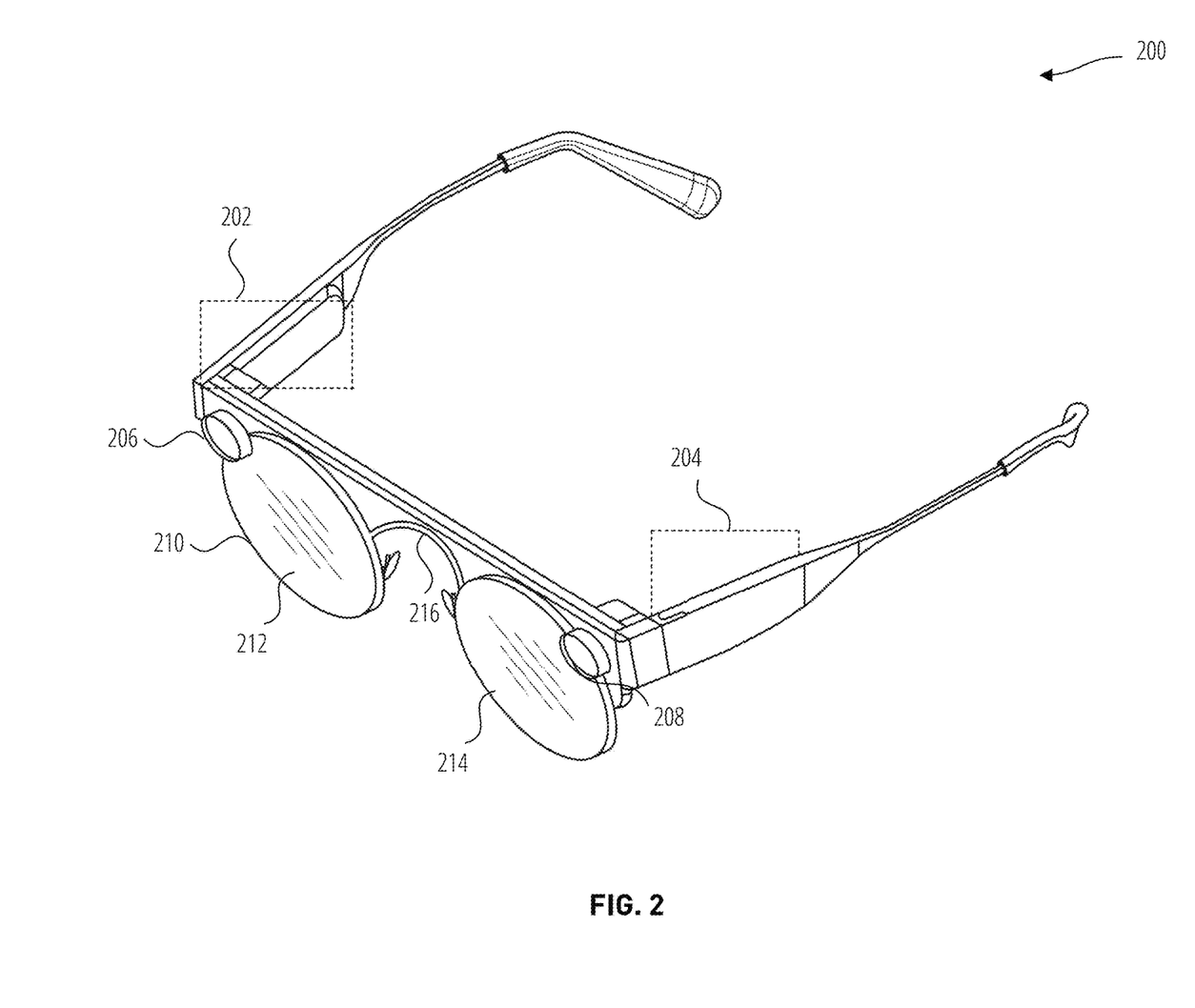
FIG. 2 illustrates a head-wearable apparatus, according to one example embodiment.

FIG. 2 illustrates a head-wearable apparatus 200, according to one example embodiment. FIG. 2 illustrates a perspective view of the head-wearable apparatus 200 according to one example embodiment. In some examples, the client device 102 may include the head-wearable apparatus 200. In some examples, the head-wearable apparatus may be part of the messaging server system 108.

In FIG. 2, the head-wearable apparatus 200 is a pair of eyeglasses. In some embodiments, the head-wearable apparatus 200 can be sunglasses or goggles. Some embodiments can include one or more wearable devices, such as a pendant with an integrated camera that is integrated with, in communication with, or coupled to, the head-wearable apparatus 200 or a client device 102. Any desired wearable device may be used in conjunction with the embodiments of the present disclosure, such as a watch, a headset, a wristband, earbuds, clothing (such as a hat or jacket with integrated electronics), a clip-on electronic device, or any other wearable devices. It is understood that, while not shown, one or more portions of the system included in the head-wearable apparatus 200 can be included in a client device 102 that can be used in conjunction with the head-wearable apparatus 200.

In FIG. 2, the head-wearable apparatus 200 is a pair of eyeglasses that includes a frame 210 that includes eye wires (or rims) that are coupled to two stems (or temples), respectively, via hinges and/or end pieces. The eye wires of the frame 210 carry or hold a pair of lenses (e.g., lens 212 and lens 214). The frame 210 includes a first (e.g., right) side that is coupled to the first stem and a second (e.g., left) side that is coupled to the second stem. The first side is opposite the second side of the frame 210.

The head-wearable apparatus 200 further includes a camera module (not shown) that includes camera lenses (e.g., camera lens 206, camera lens 208) and at least one image sensor. The camera lens 206 and camera lens 208 may be a perspective camera lens or a non-perspective camera lens. A non-perspective camera lens may be, for example, a fisheye lens, a wide-angle lens, an omnidirectional lens, etc. The image sensor captures digital video through the camera lens 206 and camera lens 208. The images may be also be still image frame or a video including a plurality of still image frames. The camera module can be coupled to the frame 210. As shown in FIG. 2 the frame 210 is coupled to the camera lens 206 and camera lens 208 such that the camera lenses (e.g., camera lens 206, camera lens 208) face away from the user (e.g., rear-facing cameras). The camera lens 206 and camera lens 208 can be perpendicular to the lens 212 and lens 214. The camera module can further include dual-front facing cameras (e.g., cameras that face the user) that are separated by the width of the frame 210 or the width of the head of the user of the head-wearable apparatus 200.

In FIG. 2, the two stems (or temples) are respectively coupled to microphone housing 202 and microphone housing 204. The first and second stems are coupled to opposite sides of a frame 210 of the head-wearable apparatus 200. The temples are couples to the frame 210 via temple attachments. The first stem is coupled to the first microphone housing 202 and the second stem is coupled to the second microphone housing 204. The microphone housing 202 and microphone housing 204 can be coupled to the stems between the locations of the frame 210 and the temple tips. The microphone housing 202 and microphone housing 204 can be located on either side of the user's temples when the user is wearing the head-wearable apparatus 200.

The nose bridge 216 is affixed between the camera lenses (lens 212 and lens 214). The nose bridge 216 includes an actuator system. In some examples, the actuator system includes at least two pneumatic actuators on either side of the nose bridge 216. The pneumatic actuators of each actuator system are connected via one or more air lines to an air tank (not pictured). The air tank may contain some form of pressurized gas. The actuator system expands or shrinks the length of the nose bridge 216 based on measurement data provided by the actuator control system 130.

As shown in FIG. 2, the microphone housing 202 and microphone housing 204 encase a plurality of microphones (not shown). The microphones are air interface sound pickup devices that convert sound into an electrical signal. More specifically, the microphones are transducers that convert acoustic pressure into electrical signals (e.g., acoustic signals). Microphones can be digital or analog microelectromechanical systems (MEMS) microphones. The acoustic signals generated by the microphones can be pulse density modulation (PDM) signals.

Although the described flow diagram below can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 3:
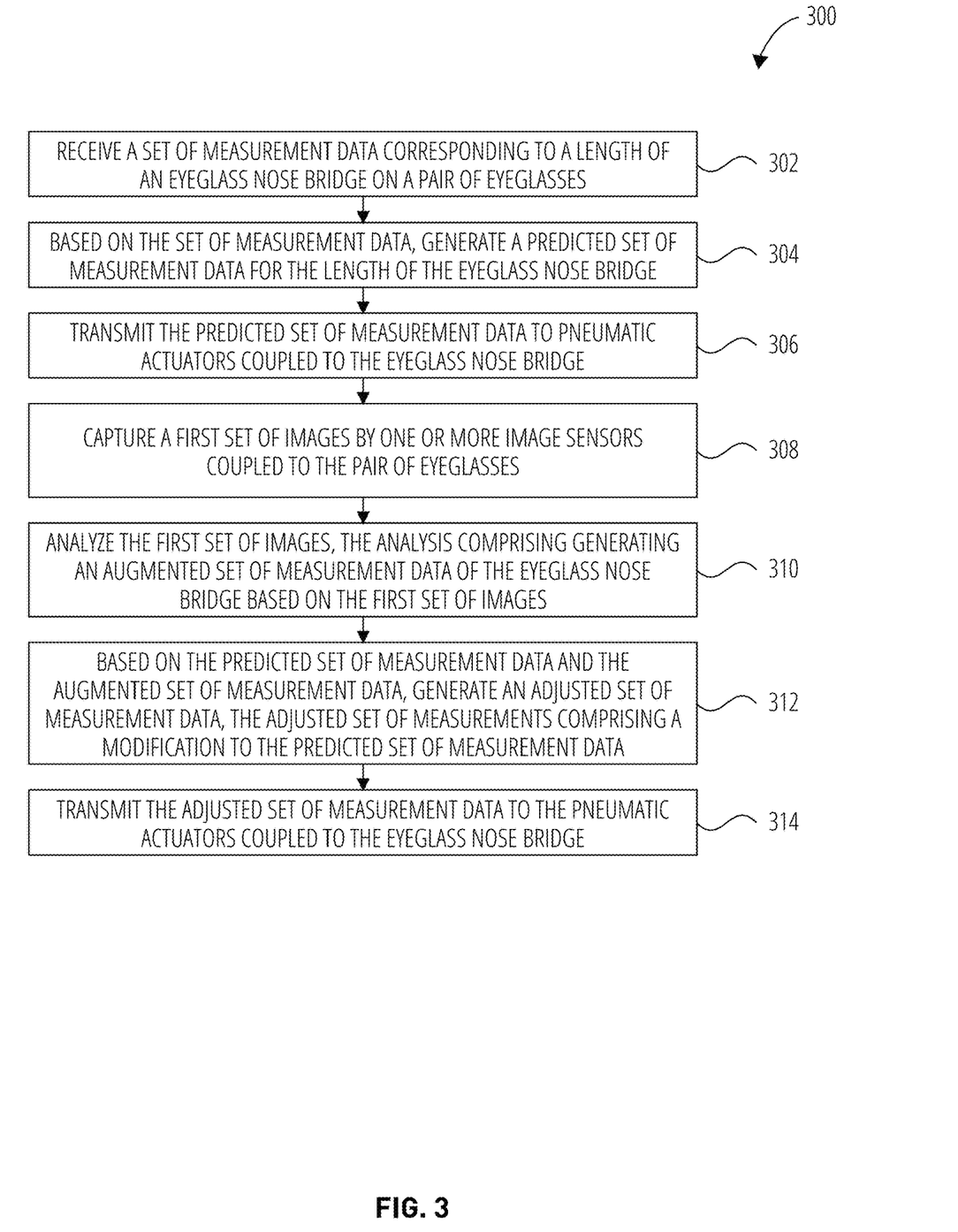
FIG. 3 is a method for remotely adjusting the length of the nose bridge on a pair of wearable eyeglasses, according to example embodiments.

FIG. 3 is a method 300 for remotely adjusting the length of the nose bridge on a pair of wearable eyeglasses, according to example embodiments. In one example, the processor in client device 102, the processor in a head-wearable apparatus 200, the processor in the messaging server system 108, the processor in the actuator control system 130, or any combination thereof, can perform the operations in the method 300.

At operation 302, the actuator control system 130 receives a set of measurement data corresponding to a length of an eyeglass nose bridge on a pair of eyeglasses. The set of measurements may include a length of the nose bridge 216. The measurements may be received by one or more sensors of the head-wearable apparatus 200.

At operation 304, the actuator control system 130 based on the set of measurement data, generates a predicted set of measurement data for the length of the eyeglass nose bridge. For example, the actuator control system 130 may use a first machine learning model that is trained to generate the predicted set of measurements. The machine learning model may be trained on historical user data that includes but is not limited to: eyeglass nose bridge lengths, user face measurements, and eyeglass lenses sizes. The first machine learning model may use further data to generate the predicted set of measurements. For example, the machine learning model may use feedback from the wearer on whether the glasses feel too tight or too loose on the wearer's face. The feedback may be received via an AR/VR display screen of the head-wearable apparatus.

In operation 306, the actuator control system 130 transmits the predicted set of measurement data to pneumatic actuators coupled to the eyeglass nose bridge. The nose bridge 216 includes a set of pneumatic actuators. The set of pneumatic actuators may include at least two pneumatic actuators (e.g., a left pneumatic actuator on the left and a right pneumatic actuator on the right). The predicted set of measurement data may include a first set of measurements for the left pneumatic actuator and a second set of measurements for the right pneumatic actuator.

During operation 306, the actuator control system 130 may cause the set of pneumatic actuators to adjust the length of the nose bridge based on the predicted set of measurement data. The pneumatic actuators may be coupled to the frame 210 of the head-wearable apparatus 200. The nose bridge 216 may be constructed out of a material that can roll in and out to expand or shrink the required distance. The material may be inside a tubular cover and can move in and out of the exterior tubular cover to adjust its length.

In some examples, before causing the pneumatic actuators to adjust the length of the nose bridge 216, the actuator control system 130 generates a notification comprising instructions to modify a position status of the pair of eyeglasses. For example, a position status of the pair of eyeglasses may represent that the pair of eyeglasses is being worn on someone's face. The notification may include instructions that require the user to remove the eyeglasses from their face and to play the eyeglasses on a flat, stable, non-moving surface. The actuator control system 130 causes display of the notification on a display device coupled to the pair of eyeglasses. The actuator control system 130 receives an indication from one or more position sensors of the pair of eyeglasses. For example, the indication includes updated position status data of the pair of eyeglasses. Once the actuator control system 130 receives the indication of updated position status data of the pair of eyeglasses, the actuator control system 130 causes the pneumatic actuators to generate mechanical motion based on the predicted set of measurement data (e.g., shrink or expand the length of the nose bridge based on the predicted set of measurement data).

At operation 308, the actuator control system 130 captures a first set of images by one or more image sensors coupled to the pair of eyeglasses. The one or more image sensors include at least the rear facing cameras and front facing cameras of the head-wearable apparatus 200. The set of images comprise a plurality of views of the eyeglass nose bridge.

At operation 310, the actuator control system 130 analyzes the first set of images using a second machine learning model. The second machine learning model generates an augmented set of measurement data of the eyeglass nose bridge based on an analysis of the first set of images. The second machine learning model is trained on an image dataset that includes images of eyeglasses including nose bridges and images of eyeglasses placed on a wearer's face.

In some examples, the actuator control system 130 captures a second set of images that comprise a view of the wearer's face and the nose bridge 216. For example, the second set of images may capture views of the position of the nose bridge 216 relative to the wearer's nose. The second set of images may be analyzed using the second machine learning model described above. The analysis of the second set of images may include extracting color data from the images captured by a front facing camera. The color data may describe an amount of pressure the nose bridge 216 is applying on the wearer's face. Based on the amount of pressure, the actuator control system 130 generates the augmented set of measurement data for the nose bridge 216. The augmented set of measurement data may be generated based on an analysis of both the first set of images comprising views of only the eyeglass nose bridge 216 while the wearer is not wearing the head wearable apparatus 200, and the second set of images comprising views of the nose bridge 216 relative to wearer's face. During operation 308 the wearer of the pair of eyeglasses may be instructed to remove the glasses during capture of the first set of images and to wear the glasses during capture of the second set of images.

At operation 312, based on the predicted set of measurement data and the augmented set of measurement data, the actuator control system 130 generates an adjusted set of measurement data. The adjusted set of measurements comprises a modification to the predicted set of measurement data.

At operation 314, the actuator control system 130 transmits the adjusted set of measurement data to the pneumatic actuators coupled to the eyeglass nose bridge 216. The adjusted set of measurement data may include a first set of data that is transmitted to the first pneumatic actuator (e.g., Left pneumatic actuator) and a second set of data that is transmitted to the second pneumatic actuator (e.g., right pneumatic actuator).

In some examples, the actuator control system 130 causes display of a set of prescription image data on a display device coupled to the pair of eyeglasses (e.g., head wearable apparatus 200). The set of prescription image data may include vision test images that include numbers, text, colors, or any suitable data to test a user's vision capabilities. If a user who typically has normal visual acuity is unable to clearly see the set of prescription image data, then the length of the nose bridge 216 may need to be further adjusted. The actuator control system 130 can receive user feedback based on the displayed set of prescription image data and generates an updated set of measurement data for the length of the eyeglass nose bridge 216 based on the user feedback. The user feedback may be received by a microphone coupled to the pair of eyeglasses (e.g., via the microphone housing 202, microphone housing 204), by user gestures captured by the rear-facing camera of the pair of glasses, by tactile input received by the pair of eyeglasses, or any combination thereof. The updated set of measurement data may be transmitted to the pneumatic actuators coupled to the nose bridge 216 and the actuator control system 130 causes the pneumatic actuators to generate mechanical motion based on the updated set of measurement data.

Machine Architecture

Figure 4:
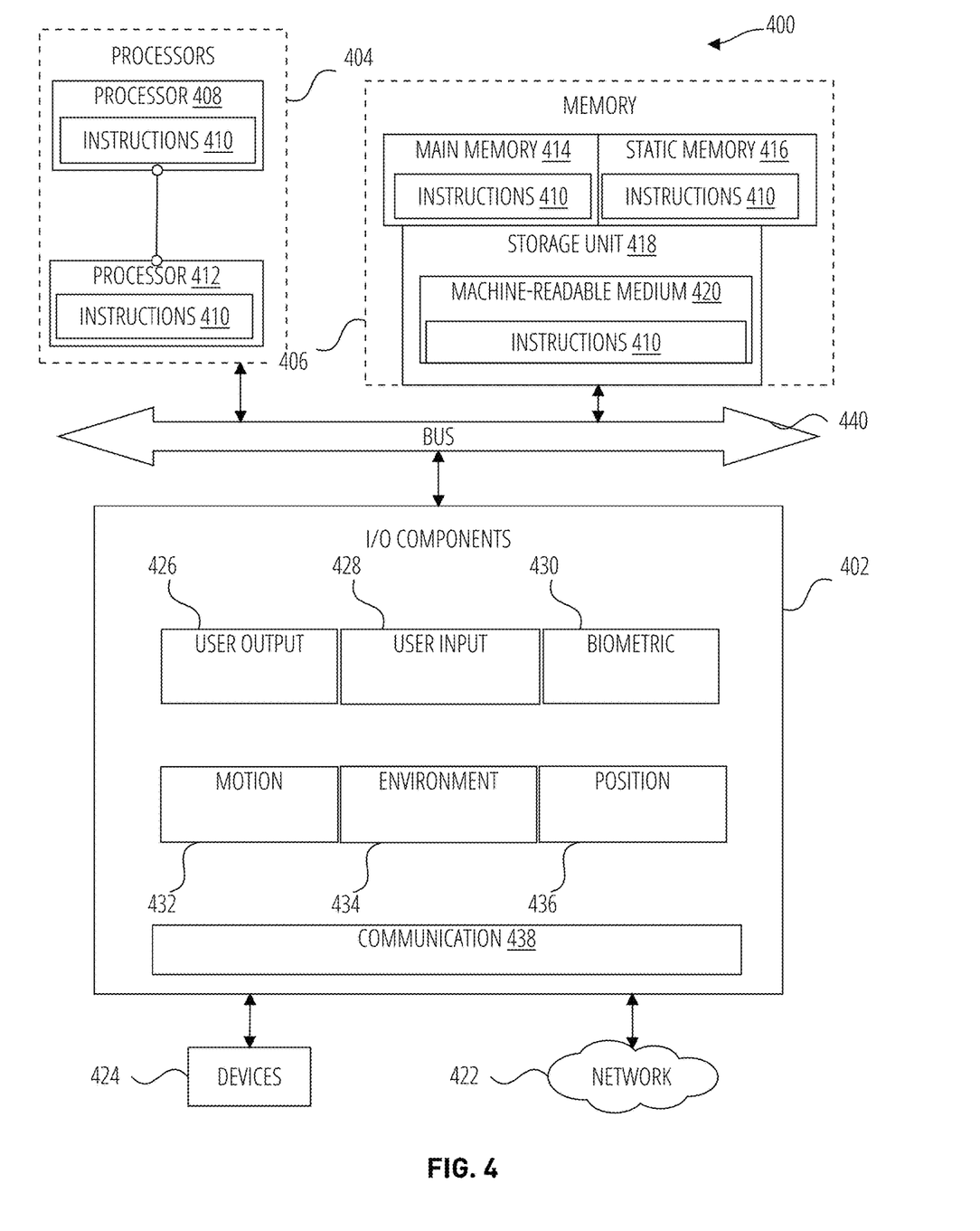
FIG. 4 is a diagrammatic representation of the machine within which instructions (e.g., software, a program, an application, an applet, an app, or other executable code) for causing the machine to perform any one or more of the methodologies discussed herein may be executed.

FIG. 4 is a diagrammatic representation of the machine 400 within which instructions 410 (e.g., software, a program, an application, an applet, an app, or other executable code) for causing the machine 400 to perform any one or more of the methodologies discussed herein may be executed. For example, the instructions 410 may cause the machine 400 to execute any one or more of the methods described herein. The instructions 410 transform the general, non-programmed machine 400 into a particular machine 400 programmed to carry out the described and illustrated functions in the manner described. The machine 400 may operate as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein. The machine 400, for example, may comprise the client device 102 or any one of a number of server devices forming part of the messaging server system 108. In some examples, the machine 400 may also comprise both client and server systems, with certain operations of a particular method or algorithm being performed on the server-side and with certain operations of the particular method or algorithm being performed on the client-side.

The machine 400 may include processors 404, memory 406, and input/output I/O components 402, which may be configured to communicate with each other via a bus 440. In an example, the processors 404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 408 and a processor 412 that execute the instructions 410. The term "processor" is intended to include multi-core processors that may comprise two or more independent processors (sometimes referred to as "cores") that may execute instructions contemporaneously. Although FIG. 4 shows multiple processors 404, the machine 400 may include a single processor with a single-core, a single processor with multiple cores (e.g., a multi-core processor), multiple processors with a single core, multiple processors with multiples cores, or any combination thereof.

The memory 406 includes a main memory 414, a static memory 416, and a storage unit 418, both accessible to the processors 404 via the bus 440. The main memory 406, the static memory 416, and storage unit 418 store the instructions 410 embodying any one or more of the methodologies or functions described herein. The instructions 410 may also reside, completely or partially, within the main memory 414, within the static memory 416, within machine-readable medium 420 within the storage unit 418, within at least one of the processors 404 (e.g., within the Processor's cache memory), or any suitable combination thereof, during execution thereof by the machine 400.

The I/O components 402 may include a wide variety of components to receive input, provide output, produce output, transmit information, exchange information, capture measurements, and so on. The specific I/O components 402 that are included in a particular machine will depend on the type of machine. For example, portable machines such as mobile phones may include a touch input device or other such input mechanisms, while a headless server machine will likely not include such a touch input device. It will be appreciated that the I/O components 402 may include many other components that are not shown in FIG. 4. In various examples, the I/O components 402 may include user output components 426 and user input components 428. The user output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 402 may include biometric components 430, motion components 432, environmental components 434, or position components 436, among a wide array of other components. For example, the biometric components 430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 432 include acceleration sensor components (e.g., accelerometer), gravitation sensor components, rotation sensor components (e.g., gyroscope).

The environmental components 434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 402 further include communication components 438 operable to couple the machine 400 to a network 422 or devices 424 via respective coupling or connections. For example, the communication components 438 may include a network interface Component or another suitable device to interface with the network 422. In further examples, the communication components 438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 424 may be another machine or any of a wide variety of peripheral devices (e.g., a peripheral device coupled via a USB).

Moreover, the communication components 438 may detect identifiers or include components operable to detect identifiers. For example, the communication components 438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 438, such as location via Internet Protocol (IP) geolocation, location via Wi-Fi® signal triangulation, location via detecting an NFC beacon signal that may indicate a particular location, and so forth.

The various memories (e.g., main memory 414, static memory 416, and memory of the processors 404) and storage unit 418 may store one or more sets of instructions and data structures (e.g., software) embodying or used by any one or more of the methodologies or functions described herein. These instructions (e.g., the instructions 410), when executed by processors 404, cause various operations to implement the disclosed examples.

The instructions 410 may be transmitted or received over the network 422, using a transmission medium, via a network interface device (e.g., a network interface component included in the communication components 438) and using any one of several well-known transfer protocols (e.g., hypertext transfer protocol (HTTP)). Similarly, the instructions 410 may be transmitted or received using a transmission medium via a coupling (e.g., a peer-to-peer coupling) to the devices 424.

Software Architecture

Figure 5:
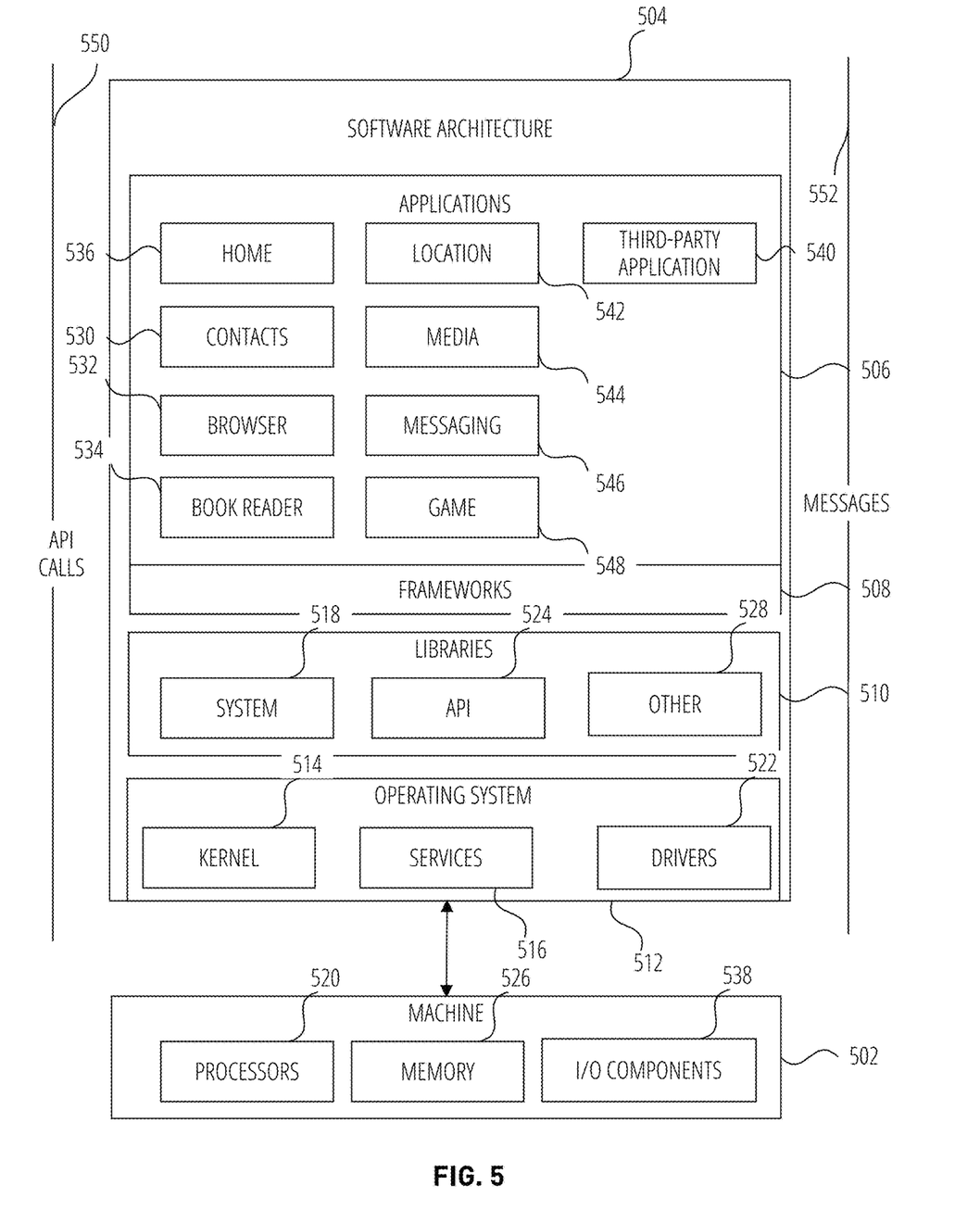
FIG. 5 is a block diagram illustrating a software architecture, which can be installed on any one or more of the devices described herein.

FIG. 5 is a block diagram 500 illustrating a software architecture 504, which can be installed on any one or more of the devices described herein. The software architecture 504 is supported by hardware such as a machine 502 that includes processors 520, memory 526, and I/O components 538. In this example, the software architecture 504 can be conceptualized as a stack of layers, where each layer provides a particular functionality. The software architecture 504 includes layers such as an operating system 512, libraries 510, frameworks 508, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionality. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 510 provide a common low-level infrastructure used by the applications 506. The libraries 510 can include system libraries 518 (e.g., C standard library) that provide functions such as memory allocation functions, string manipulation functions, mathematic functions, and the like. In addition, the libraries 510 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 510 can also include a wide variety of other libraries 528 to provide many other APIs to the applications 506.

The frameworks 508 provide a common high-level infrastructure that is used by the applications 506. For example, the frameworks 508 provide various graphical user interface (GUI) functions, high-level resource management, and high-level location services. The frameworks 508 can provide a broad spectrum of other APIs that can be used by the applications 506, some of which may be specific to a particular operating system or platform.

In an example, the applications 506 may include a home application 536, a contacts application 530, a browser application 532, a book reader application 534, a location application 542, a media application 544, a messaging application 546, a game application 548, and a broad assortment of other applications such as a third-party application 540. The applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party application 540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 540 can invoke the API calls 550 provided by the operating system 512 to facilitate functionality described herein.

System with Head-Wearable Apparatus

Figure 6:
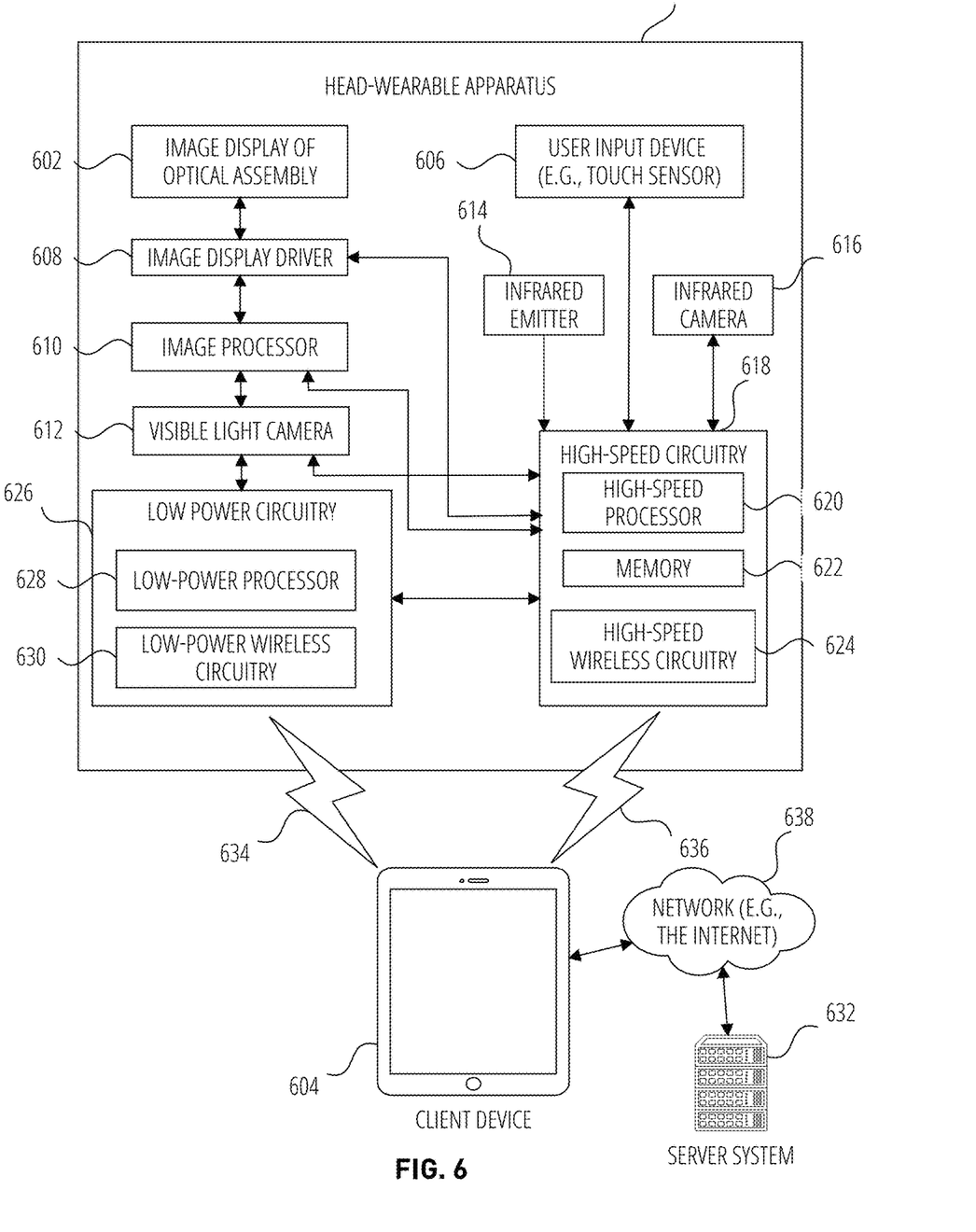
FIG. 6 illustrates an aspect of the subject matter in accordance with one embodiment.

FIG. 6 illustrates a system in which the head-wearable apparatus 200 can be implemented according to one example embodiment. FIG. 6 is a high-level functional block diagram of an example head-wearable apparatus 200 communicatively coupled a mobile client device 102 (or client device 604) and a server system 632 via various network 638.

Head-wearable apparatus 200 includes a camera, such as at least one of visible light camera 612, infrared emitter 614 and infrared camera 616. The camera can include the camera module with the camera lens 206 and camera lens 208 in FIG. 1.

Client device 102 can be capable of connecting with head-wearable apparatus 200 using both a low-power wireless connection 634 and a high-speed wireless connection 636. Client device 102 is connected to server system 632 and network 638. The network 638 may include any combination of wired and wireless connections.

Head-wearable apparatus 200 further includes two image displays of the image display of optical assembly 602. The two image displays image display of optical assembly 602 include one associated with the left lateral side and one associated with the right lateral side of the head-wearable apparatus 200. Head-wearable apparatus 200 also includes image display driver 608, image processor 610, low-power low power circuitry 626, and high-speed circuitry 618. Image display of optical assembly 602 are for presenting images and videos, including an image that can include a graphical user interface to a user of the head-wearable apparatus 200.

Image display driver 608 commands and controls the image display of the image display of optical assembly 602. Image display driver 608 may deliver image data directly to the image display of the image display of optical assembly 602 for presentation or may have to convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 200 includes a frame 210 and stems (or temples) extending from a lateral side of the frame 210. Head-wearable apparatus 200 further includes a user input device 606 (e.g., touch sensor or push button) including an input surface on the head-wearable apparatus 200. The user input device 606 (e.g., touch sensor or push button) is to receive from the user an input selection to manipulate the graphical user interface of the presented image.

The components shown in FIG. 6 for the head-wearable apparatus 200 are located on one or more circuit boards, for example a PCB or flexible PCB, in the rims or temples. Alternatively or additionally, the depicted components can be located in the chunks, frames, hinges, or bridge of the head-wearable apparatus 200. Left and right visible light cameras 612 can include digital camera elements such as a complementary metal-oxide-semiconductor (CMOS) image sensor, charge coupled device, a camera lens 206 and camera lens 208, or any other respective visible or light capturing elements that may be used to capture data, including images of scenes with unknown objects.

Head-wearable apparatus 200 includes a memory 622 which stores instructions to perform a subset or all of the functions described herein. Memory 622 can also include storage device.

As shown in FIG. 6, high-speed circuitry 618 includes high-speed processor 620, memory 622, and high-speed wireless circuitry 624. In the example, the image display driver 608 is coupled to the high-speed circuitry 618 and operated by the high-speed processor 620 in order to drive the left and right image displays of the image display of optical assembly 602. High-speed processor 620 may be any processor capable of managing high-speed communications and operation of any general computing system needed for head-wearable apparatus 200. High-speed processor 620 includes processing resources needed for managing high-speed data transfers on high-speed wireless connection 636 to a wireless local area network (WLAN) using high-speed wireless circuitry 624. In certain examples, the high-speed processor 620 executes an operating system such as a LINUX operating system or other such operating system of the head-wearable apparatus 200 and the operating system is stored in memory 622 for execution. In addition to any other responsibilities, the high-speed processor 620 executing a software architecture for the head-wearable apparatus 200 is used to manage data transfers with high-speed wireless circuitry 624. In certain examples, high-speed wireless circuitry 624 is configured to implement Institute of Electrical and Electronic Engineers (IEEE) 802.11 communication standards, also referred to herein as Wi-Fi. In other examples, other high-speed communications standards may be implemented by high-speed wireless circuitry 624.

Low-power wireless circuitry 630 and the high-speed wireless circuitry 624 of the head-wearable apparatus 200 can include short range transceivers (Bluetooth™) and wireless wide, local, or wide area network transceivers (e.g., cellular or WiFi). Client device 102, including the transceivers communicating via the low-power wireless connection 634 and high-speed wireless connection 636, may be implemented using details of the architecture of the head-wearable apparatus 200, as can other elements of network 638.

Memory 622 includes any storage device capable of storing various data and applications, including, among other things, camera data generated by the left and right visible light cameras 612, infrared camera 616, and the image processor 610, as well as images generated for display by the image display driver 608 on the image displays of the image display of optical assembly 602. While memory 622 is shown as integrated with high-speed circuitry 618, in other examples, memory 622 may be an independent stand-alone element of the head-wearable apparatus 200. In certain such examples, electrical routing lines may provide a connection through a chip that includes the high-speed processor 620 from the image processor 610 or low-power processor 628 to the memory 622. In other examples, the high-speed processor 620 may manage addressing of memory 622 such that the low-power processor 628 will boot the high-speed processor 620 any time that a read or write operation involving memory 622 is needed.

As shown in FIG. 6, the low-power processor 628 or high-speed processor 620 of the head-wearable apparatus 200 can be coupled to the camera (visible light camera 612; infrared emitter 614, or infrared camera 616), the image display driver 608, the user input device 606 (e.g., touch sensor or push button), and the memory 622.

Head-wearable apparatus 200 is connected with a host computer. For example, the head-wearable apparatus 200 is paired with the client device 102 via the high-speed wireless connection 636 or connected to the server system 632 via the network 638. Server system 632 may be one or more computing devices as part of a service or network computing system, for example, that include a processor, a memory, and network communication interface to communicate over the network 638 with the client device 102 and head-wearable apparatus 200.

The client device 102 includes a processor and a network communication interface coupled to the processor. The network communication interface allows for communication over the network 638, low-power wireless connection 634 or high-speed wireless connection 636. Client device 102 can further store at least portions of the instructions for generating a binaural audio content in the client device 102's memory to implement the functionality described herein.

Output components of the head-wearable apparatus 200 include visual components, such as a display such as a liquid crystal display (LCD), a plasma display panel (PDP), a light emitting diode (LED) display, a projector, or a waveguide. The image displays of the optical assembly are driven by the image display driver 608. The output components of the head-wearable apparatus 200 further include acoustic components (e.g., speakers), haptic components (e.g., a vibratory motor), other signal generators, and so forth. The input components of the head-wearable apparatus 200, the client device 102, and server system 632, such as the user input device 606, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Head-wearable apparatus 200 may optionally include additional peripheral device elements. Such peripheral device elements may include biometric sensors, additional sensors, or display elements integrated with head-wearable apparatus 200. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 634 and high-speed wireless connection 636 from the client device 102 via the low-power wireless circuitry 630 or high-speed wireless circuitry 624.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   receiving a set of measurement data corresponding to a length of an eyeglass nose bridge on a pair of eyeglasses;
   based on the set of measurement data, generating a predicted set of measurement data for the length of the eyeglass nose bridge;
   transmitting the predicted set of measurement data to pneumatic actuators coupled to the eyeglass nose bridge;
   capturing a first set of images by one or more image sensors coupled to the pair of eyeglasses, the first set of images comprising a plurality of views of the eyeglass nose bridge;
   analyzing the first set of images, the analysis comprising generating an augmented set of measurement data of the eyeglass nose bridge based on the first set of images;
   based on the predicted set of measurement data and the augmented set of measurement data, generating an adjusted set of measurement data, the adjusted set of measurements comprising a modification to the predicted set of measurement data; and
   transmitting the adjusted set of measurement data to the pneumatic actuators coupled to the eyeglass nose bridge.

2. The method of claim 1, wherein transmitting the predicted set of measurement data further comprises:
   generating a notification comprising instructions to modify a position status of the pair of eyeglasses;
   causing display of the notification on a display device coupled to the pair of eyeglasses;
   receiving an indication from one or more position sensors of the pair of eyeglasses, the indication comprising updated position status data of the pair of eyeglasses; and
   causing the pneumatic actuators to modify the length of the eyeglass nose bridge based on the predicted set of measurement data.

3. The method of claim 1, further comprising:
   causing display of a set of prescription image data on a display device coupled to the pair of eyeglasses;
   receiving user feedback based on the displayed set of prescription image data; and
   generating an updated set of measurements for the length of the eyeglass nose bridge.

4. The method of claim 3, wherein the user feedback is received as audio feedback from a microphone coupled to the pair of eyeglasses.

5. The method of claim 1, wherein the predicted set of measurement data is generated using a first machine learning model trained on historical user data, the historical user data comprising at least one of: eyeglass nose bridge lengths, user face measurements, and eyeglass lenses sizes.

6. The method of claim 1, wherein the augmented set of measurement data is generated using a second machine learning model trained to analyze the first set of images.

7. The method of claim 6, further comprising:
capturing a second set of images by the one or more image sensors coupled to the pair of eyeglasses, the second set of images comprising a plurality of views of the eyeglass nose bridge relative to a user's face.

8. The method of claim 7, further comprising:
analyzing the first set of images and the second set of images using the second machine learning model; and
generating the augmented set of measurement data of the eyeglass nose bridge based on the analysis of the first set of images and the second set of images.

9. The method of claim 1, wherein the eyeglass nose bridge comprises an actuator system, the actuator system comprising a set of pneumatic actuators.

10. The method of claim 9, wherein the actuator system is physically coupled to an air tank via an air line.

11. An apparatus comprising:
a pair of eyeglasses, the pair of eyeglasses comprising a frame, the frame comprising a pair of lenses, wherein the pair of lenses comprises a first lens and a second lens;
an actuated nose bridge affixed between the first lens and the second lens;
an actuator system coupled to the nose bridge, the actuator system modifying a length of the actuated nose bridge based on an adjusted set of measurement data, the adjusted set of measurement data based on a set of measurement data corresponding to the length of the actuated nose bridge and an augmented set of measurement data based on an analysis of a set of images comprising a plurality of views of the actuated nose bridge; and
a camera system coupled to the frame of the pair of eyeglasses, the camera system comprising a front facing camera and a rear-facing camera.

12. The apparatus of claim 11, wherein the actuator system comprises a set of pneumatic actuators.

13. A non-transitory computer-readable storage medium, the computer-readable storage medium including instructions that when executed by a computer, cause the computer to:
receive a set of measurement data corresponding to a length of an eyeglass nose bridge on a pair of eyeglasses;
based on the set of measurement data, generate a predicted set of measurement data for the length of the eyeglass nose bridge;
transmit the predicted set of measurement data to pneumatic actuators coupled to the eyeglass nose bridge;
capture a first set of images by one or more image sensors coupled to the pair of eyeglasses, the first set of images comprising a plurality of views of the eyeglass nose bridge;
analyze the first set of images, the analysis comprising generating an augmented set of measurement data of the eyeglass nose bridge based on the first set of images;
based on the predicted set of measurement data and the augmented set of measurement data, generate an adjusted set of measurement data, the adjusted set of measurements comprising a modification to the predicted set of measurement data; and
transmit the adjusted set of measurement data to the pneumatic actuators coupled to the eyeglass nose bridge.

14. The computer-readable storage medium of claim 13, wherein transmitting the predicted set of measurement data further comprises:
generate a notification comprising instructions to modify a position status of the pair of eyeglasses;
cause display of the notification on a display device coupled to the pair of eyeglasses;
receive an indication from one or more position sensors of the pair of eyeglasses, the indication comprising updated position status data of the pair of eyeglasses; and
cause the pneumatic actuators to modify the length of the eyeglass nose bridge based on the predicted set of measurement data.

15. The computer-readable storage medium of claim 13, wherein the instructions further configure the computer to:
cause display of a set of prescription image data on a display device coupled to the pair of eyeglasses;
receive user feedback based on the displayed set of prescription image data; and
generate an updated set of measurements for the length of the eyeglass nose bridge.

16. The computer-readable storage medium of claim 15, wherein the user feedback is received as audio feedback from a microphone coupled to the pair of eyeglasses.

17. The computer-readable storage medium of claim 13, wherein the predicted set of measurement data is generated use a first machine learning model trained on historical user data, the historical user data comprising at least one of: eyeglass nose bridge lengths, user face measurements, and eyeglass lenses sizes.

18. The computer-readable storage medium of claim 13, wherein the augmented set of measurement data is generated use a second machine learning model trained to analyze the first set of images.

19. The computer-readable storage medium of claim 18, wherein the instructions further configure the computer to:
capture a second set of images by the one or more image sensors coupled to the pair of eyeglasses, the second set of images comprising a plurality of views of the eyeglass nose bridge relative to a user's face.

20. The computer-readable storage medium of claim 19, wherein the instructions further configure the computer to:
analyze the first set of images and the second set of images using the second machine learning model; and
generate the augmented set of measurement data of the eyeglass nose bridge based on the analysis of the first set of images and the second set of images.

* * * * *